Figure 1:
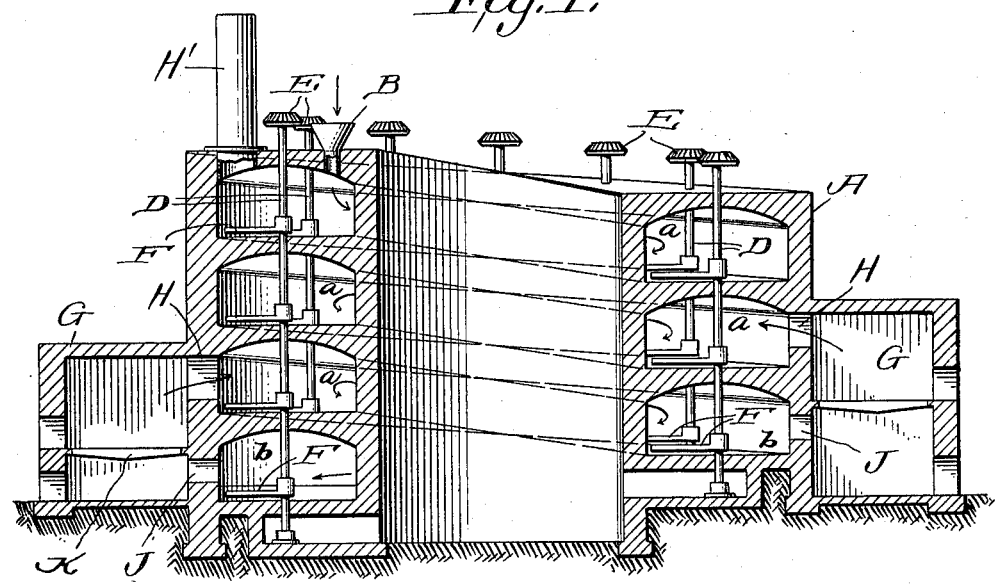

E. A. CLARK & W. H. DAVIS.
HELIXOIDAL COMBINED ORE ROASTING FURNACE AND COOLING HEARTH.
APPLICATION FILED SEPT. 27, 1910.

1,029,667.

Patented June 18, 1912.

2 SHEETS—SHEET 1.

Witnesses
Olive W. Holmes
A. D. Wright

Inventors
E. A. Clark and
W. H. Davis
By Chas E. Brock
Attorney

COLUMBIA PLANOGRAPH CO., WASHINGTON, D. C.

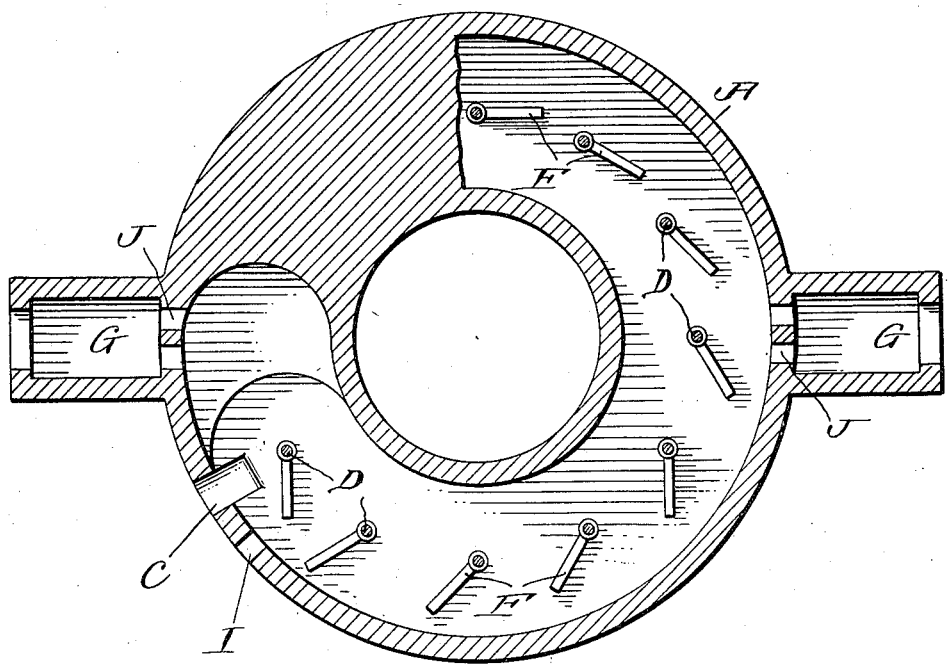
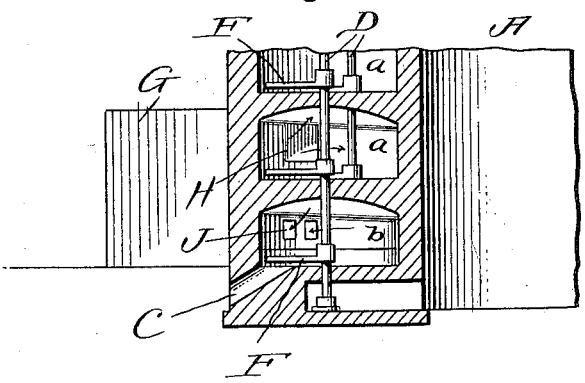

UNITED STATES PATENT OFFICE.

ELLSWORTH A. CLARK AND WILLIAM H. DAVIS, OF BOULDER, COLORADO.

HELIXOIDAL COMBINED ORE-ROASTING FURNACE AND COOLING-HEARTH.

1,029,667.  Specification of Letters Patent.  Patented June 18, 1912.

Application filed September 27, 1910. Serial No. 584,104.

*To all whom it may concern:*

Be it known that we, ELLSWORTH A. CLARK and WILLIAM H. DAVIS, citizens of the United States, residing at Boulder, in the county of Boulder and State of Colorado, have invented a new and useful Improvement in Helixoidal Combined Ore-Roasting Furnaces and Cooling-Hearths, of which the following is a specification.

In roasting tellurid or sulfo-tellurid ore for subsequent treatment by the cyanid process the particular object desired is that the gold and silver shall be in a condition whereby a ready dissolution of these metals occurs, and correlated with this desire are certain economical features of almost equal importance, such as the consumption of cyanid, the time necessary for the dissolution of the values, installation and operating costs. In considering the matter of costs it must be remembered that the operating expense is of greater importance than that of installation, since the operating expenses are continuous and will finally amount to much more than that of installation.

It is well known that potassium cyanid, considered as a reagent in the process, is an oxidizer. It therefore follows directly that cyanid consumption will be reduced by oxidation of the ore in the roasting furnace. It is also well known that when tellurium is present, this will be oxidized to tellurous oxid, which is a reducer. If the tellurium is in combination with the gold or silver, it follows that, unless sufficient time is given for sublimation, this tellurous oxid will be deposited upon the surface of the gold or silver as the case may be. By experience and microscopic observation we have found that with a temperature of about five hundred degrees C. about two hours are required to remove the last of the tellurium. If the time is less than this incrustations of $TeO_2$ will be found on the surface of the gold which will cause the leaching department of the plant to act sluggishly; and if a higher temperature is used there is danger of forcing the smaller particles of ore before the central region of the larger particle is finished. Fusion of the smaller particle would of course result in incasing such values as were contained in the particles. An increase in the time limit would also increase in cost of construction and additional cost of operation. Ordinarily with an increase of the time of the roasting would come an increase in the size of the roaster and consequently an increase of the surface from which radiation can take place. Or with a higher temperature there would come a greater obstruction of the material from which the roaster is made.

In view of the above facts we have designed a roasting furnace and cooling hearth with the object in view of regulating the time of roasting, and the temperature so as to reduce the operating costs to the lowest point, or in other words to produce a device of this kind which would have the greatest commercial efficiency. The term "helixoidal" as used herein as defining a continuous hearth returning to a position vertically below the initial point, whatever the traverse of the ore may be, without regard to the shape of the roaster, as distinguished from the term "helicoidal" which might be interpreted as referring to a circular arrangement only.

The object of the invention therefore is to obtain a form of roaster which will combine a maximum length of roasting hearth with a minimum amount of ground or floor space covered, thereby securing a device of the kind which can be built more economically than a larger building, and which will have a maximum interior heating surface and a minimum exterior radiating surface, and consequently can be operated with the minimum amount of fuel.

Figure 2:
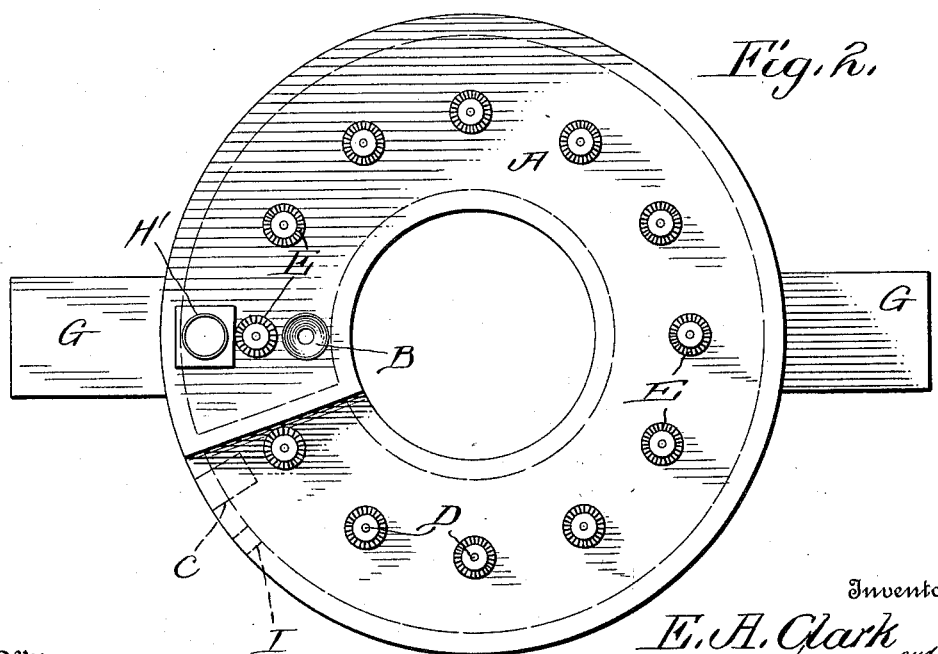

In carrying out our invention, we have illustrated one form of hearth in the accompanying drawings, in which, Figure 1 is a vertical section. Fig. 2 is a plan view. Fig. 3 is a transverse section taken upon a horizontal line immediately below the fire grates. Fig. 4 is a detail vertical section taken through the lower portion of the discharge side of the roaster.

In these drawings, A represents a cylindrical roasting furnace, which is provided with a continuous spiral helixoidal passage $a$ terminating in a similar but shorter passage $b$, which latter is a continuation of the first passage. The spiral passages $a$ form the roasting furnace and the continuation $b$ forms the cooling hearth. A feed hopper B arranged in the top of the roaster admits the ore to be roasted into the uppermost portion of the passage B. A suitable discharge opening C communicates with the lowest portion of the cooling hearth $b$. Suitable vertically arranged shafts D extend through the various floors of the passages *a* and *b* and carry at their upper ends suitable gears *e*, which are adapted to be driven by any suitable gear mechanism, not shown. Within said passages are fixed to these shafts suitable rabbles F. These are designed to be rotated in alternate directions and to act upon the ore so that as it passes through the passages it is moved along in a zig-zag manner. Suitable furnaces G are arranged adjacent the roaster A, and while we have shown two of these furnaces it will be obvious that this number may be increased, with an increase in size of the roaster. Each furnace communicates adjacent its upper end with a passage *a*, through a suitable flue H, and the heat and products of combustion from the furnace pass through the passages *a* and out through a suitable stack H'. The lower portion of each furnace, beneath the grate K communicates through an opening J with the cooling hearth *b*. A suitable air inlet I is arranged adjacent the discharge opening C and admits cold air into the hearth portion *b*, a part of said air traveling up the passage and cooling the ore by absorbing heat therefrom. The remaining portion of the air coming in through the air port I is also heated by the collecting ore and passes through the openings J and up through the bars of the grate K, thereby supplying heated air to the furnace and effecting more complete combustion of the fuel. By means of a roasting and cooling hearth combined as herein shown, the objects of our invention as previously outlined are carried out, and a considerable saving in operating costs is made. This saving is due in part to the greater utilization of the heat units from the furnace, the securing of perfect combustion by utilizing the cooling of the ore for the purpose of heating air to be admitted to the furnace, and by so arranging the passages that the ore is moved over a floor of considerable space in comparison with the exterior surface of the roaster, whereby loss of heat from radiation is avoided.

What we claim is:—

1. An ore roasting furnace and cooling hearth comprising a structure having a continuous helixoidal passage said passage comprising upper and lower portions, furnaces each having communication with said upper and lower portions, means for causing ore to travel through said passages, and means for admitting cold air from the exterior of the structure into the lower portion of said passage, a part of said cold air passing into the furnaces.

2. A device of the kind described comprising a structure having a continuous spiral passage therein, a feed hopper communicating with the upper portion of the passage, the lower end of the passage terminating in a discharge opening, means for producing an irregular, zig-zag passage of ore along the floor of said passage, the lower portion of the passage forming a cooling hearth, and the upper portion a roasting chamber, the said passage having an opening for the admission of cold air in its lower portion, furnaces arranged adjacent said structure, said furnaces having an opening communicating with the roasting portion of the passage and having an opening in communication with the cooling hearth portion of said passage, and a suitable stack leading upwardly from the upper end portion of the passage, as and for the purpose set forth.

ELLSWORTH A. CLARK.
WILLIAM H. DAVIS.

Witnesses:
GUY A. ADAMS,
R. W. LEECH.

Copies of this patent may be obtained for five cents each, by addressing the "Commissioner of Patents, Washington, D. C."